United States Patent
Sato et al.

(10) Patent No.: US 8,411,175 B2
(45) Date of Patent: Apr. 2, 2013

(54) SOLID-STATE IMAGING DEVICE AND IMAGE DEFECT CORRECTION PROCESSING CIRCUIT

(75) Inventors: Ryuki Sato, Yokohama (JP); Junichi Hosokawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 333 days.

(21) Appl. No.: 12/823,646

(22) Filed: Jun. 25, 2010

(65) Prior Publication Data

US 2011/0001853 A1    Jan. 6, 2011

(30) Foreign Application Priority Data

Jul. 1, 2009    (JP) .................................. 2009-157116

(51) Int. Cl.
*H04N 5/217*    (2011.01)
(52) U.S. Cl. ........................ 348/246; 348/241
(58) Field of Classification Search .................. None
See application file for complete search history.

(56) References Cited

U.S. PATENT DOCUMENTS

| | | | | |
|---|---|---|---|---|
| 2004/0012696 A1* | 1/2004 | Teratani et al. | ............... | 348/246 |
| 2008/0266428 A1* | 10/2008 | Egawa | ............... | 348/246 |
| 2009/0041346 A1* | 2/2009 | Tsutsumi | ............... | 382/167 |
| 2009/0310000 A1 | 12/2009 | Hosokawa et al. | | |
| 2010/0066879 A1 | 3/2010 | Tanaka | | |

FOREIGN PATENT DOCUMENTS

| | | |
|---|---|---|
| JP | 2005-168057 | 6/2005 |
| JP | 2005-286825 | 10/2005 |
| JP | 2006-148748 | 6/2006 |
| JP | 2007-335991 | 12/2007 |
| JP | 2007335991 A * | 12/2007 |
| JP | 2008-258909 | 10/2008 |
| JP | 2008-278243 | 11/2008 |

OTHER PUBLICATIONS

Office Action, mailed Dec. 4, 2012, in Japanese Patent Application No. 2009-157116, filed Jul. 1, 2009, (w/English translation), pp. 1-6.

* cited by examiner

*Primary Examiner* — Chieh M Fan
*Assistant Examiner* — Angel L Garces-Rivera
(74) *Attorney, Agent, or Firm* — Oblon, Spivak, McClelland, Maier & Neustadt, L.L.P.

(57) ABSTRACT

According to one embodiment, an image defect correction processing circuit includes a signal level comparator circuit and a defect correction circuit. The signal level comparator circuit extracts the maximum signal level and the minimum signal level from a plurality of pixel signals existing around a correction target pixel. The defect correction circuit executes defect corrections with respect to the correction target pixel.

18 Claims, 7 Drawing Sheets

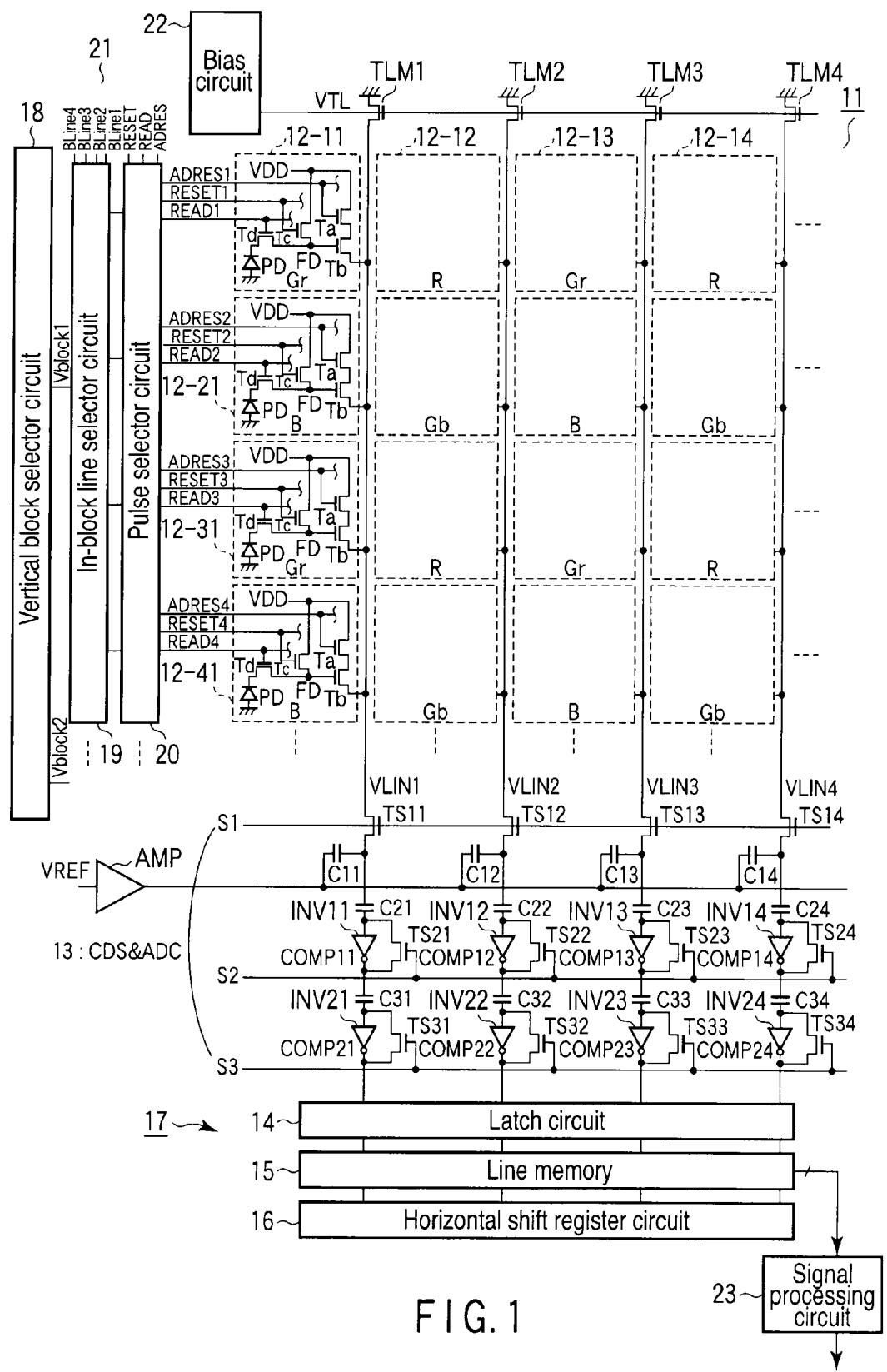
F I G. 1

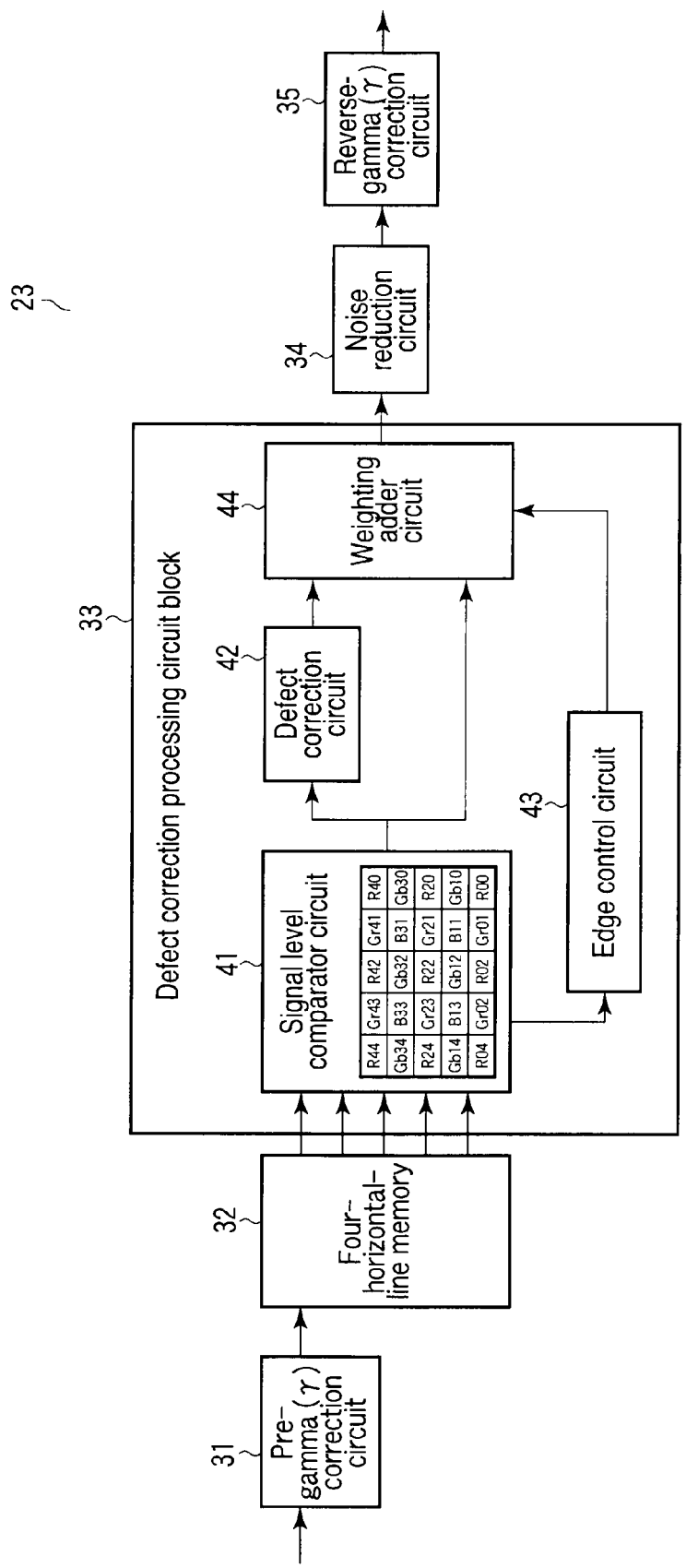
F I G. 2

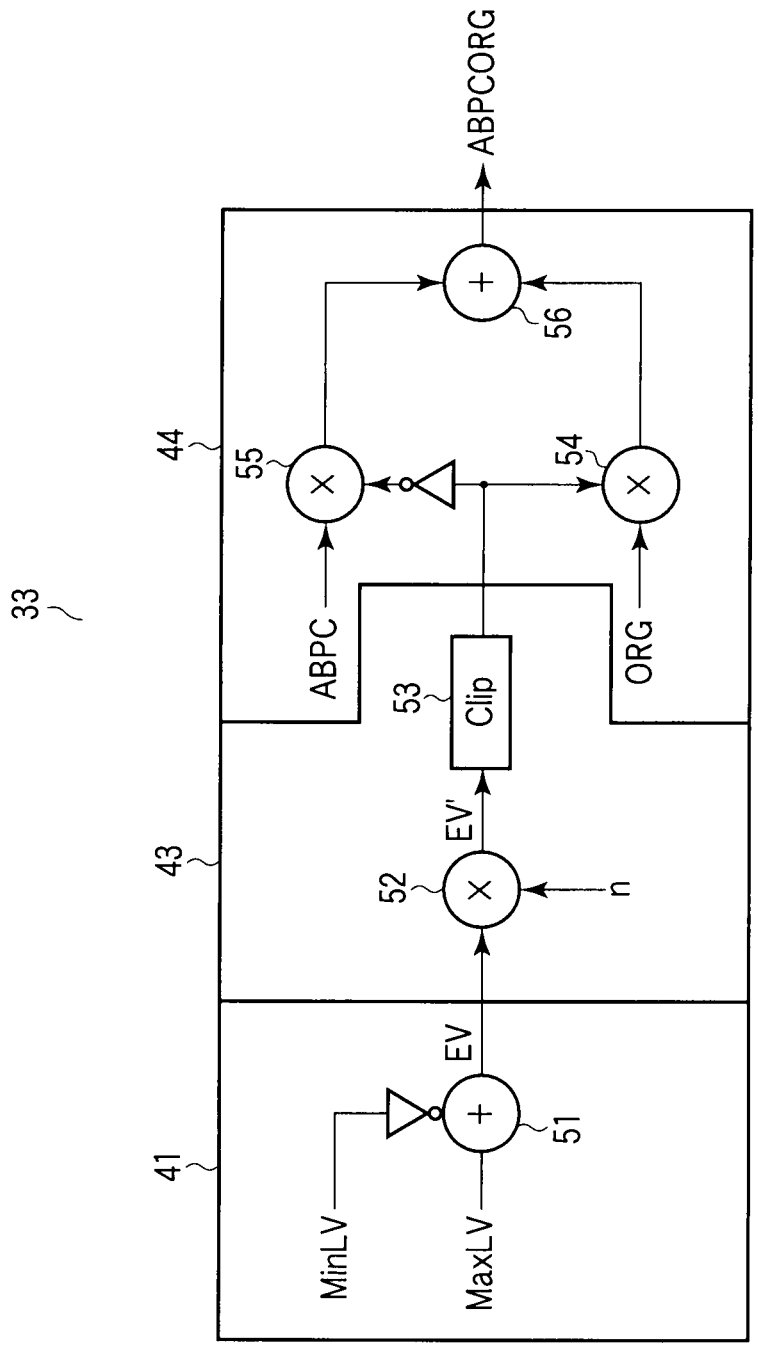
F I G. 3

| R44 | Gr43 | R42 | Gr41 | R40 |
|------|------|------|------|------|
| Gb34 | B33 | Gb32 | B31 | Gb30 |
| R24 | Gr23 | R22 | Gr21 | R20 |
| Gb14 | B13 | Gb12 | B11 | Gb10 |
| R04 | Gr03 | R02 | Gr01 | R00 |

FIG. 4

| R44 | Gr43 | R42 | Gr41 | R40 |
|------|------|------|------|------|
| Gb34 | B33 | Gb32 | B31 | Gb30 |
| R24 | Gr23 | R22 | Gr21 | R20 |
| Gb14 | B13 | Gb12 | B11 | Gb10 |
| R04 | Gr03 | R02 | Gr01 | R00 |

FIG. 5

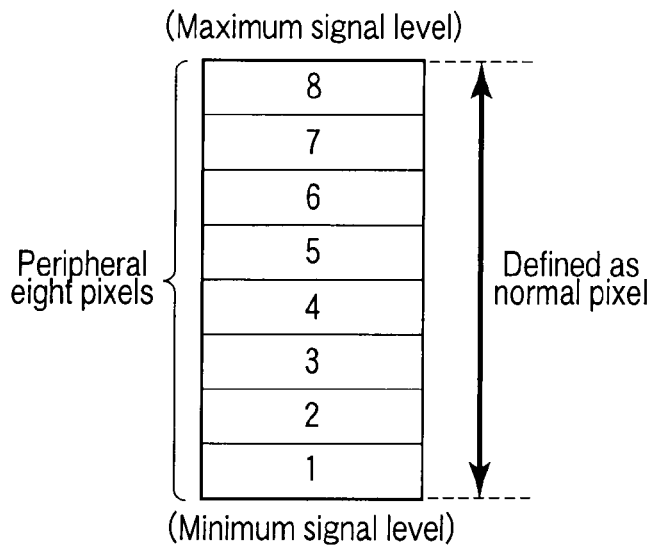
F I G. 6
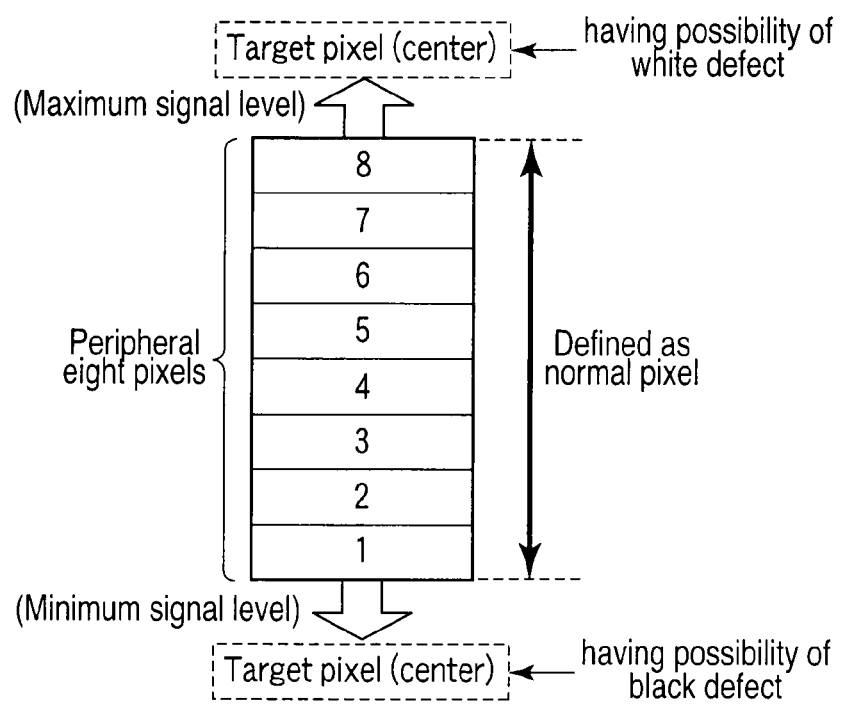
F I G. 7

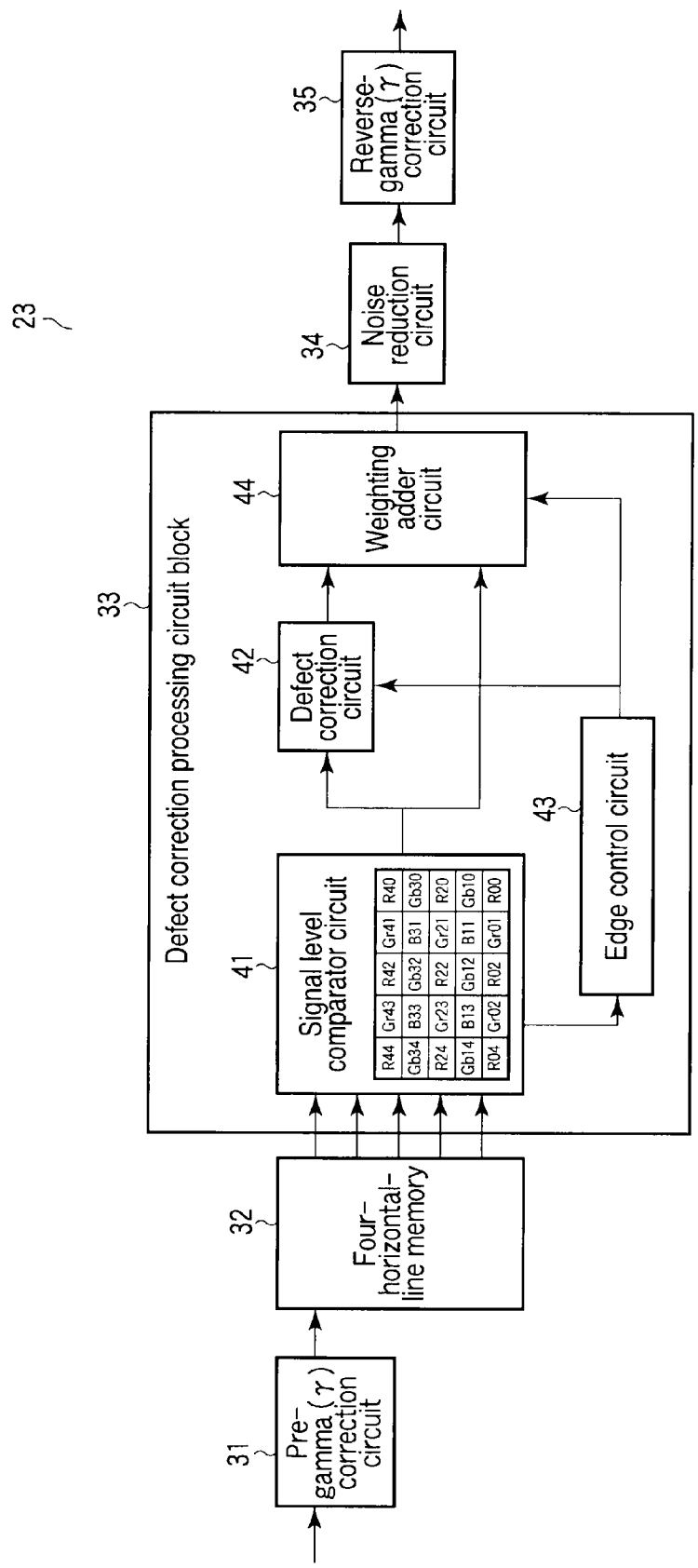
F I G. 9

SOLID-STATE IMAGING DEVICE AND IMAGE DEFECT CORRECTION PROCESSING CIRCUIT

CROSS-REFERENCE TO RELATED APPLICATIONS

This application is based upon and claims the benefit of priority from Japanese Patent Application No. 2009-157116, filed Jul. 1, 2009; the entire contents of which are incorporated herein by reference.

FIELD

Embodiments described herein relate generally to a signal processing circuit for processing a signal obtained from a pixel and to a solid-state imaging device. In particular, embodiments described herein relate generally to an image defect correction processing circuit for making corrections on a white defect and a black defect.

BACKGROUND

In a solid-state imaging device, various image processings such as defect correction are carried out by a signal processing circuit in order to perform a high quality of a signal obtained from a pixel. Jpn. Pat. Appln. KOKAI Publication No. 2007-335991 discloses the following signal processing circuit. The signal processing circuit is provided with a rearrangement circuit. This rearrangement circuit rearranges signals of a defect correction target pixel and the peripheral same-color nine pixels in the order of the magnitude of a signal level. Based on the foregoing rearrangement result, it is determined whether or not a target pixel has a defect. If the target pixel is a defect pixel, a signal level is substituted for an average value of signal levels from peripheral normal pixels; in this way, defect corrections are made.

However, the foregoing conventional signal processing circuit requires a rearrangement circuit, which rearranges signals from a plurality of pixels in the order to the magnitude of a signal level. For this reason, the circuit scale becomes large. Moreover, when making defect corrections, the conventional circuit makes corrections even if two pixels having a black defect and a white defect exist in the same-color nine pixels. For this reason, erroneous corrections easily occur; as a result, this is a factor of causing a decrease of resolution.

BRIEF DESCRIPTION OF THE DRAWINGS

FIG. 1 is a block diagram showing the configuration of a solid-state imaging device according to a first embodiment;

FIG. 2 is a block diagram showing the configuration of a signal processing circuit shown in FIG. 1;

FIG. 3 is a block diagram showing the detailed configuration of the principal part of a signal processing circuit of FIG. 2;

FIG. 4 is a view showing an arrangement of a correction target pixel processed by the signal processing circuit of FIG. 2 and the peripheral five-by-five pixels;

FIG. 5 is a view showing an arrangement of correction target pixel processed by the signal processing circuit of FIG. 2 and the peripheral same-color three-by-three pixels;

FIG. 6 is a view showing the magnitude relationship of a signal level of peripheral eight pixels of a correction target pixel processed by the signal processing circuit of FIG. 2;

FIG. 7 is a view to explain a defect determination method by the signal processing circuit of FIG. 2;

FIG. 9 is a block diagram showing the configuration of a signal processing circuit according to a third embodiment.

DETAILED DESCRIPTION

Figure 8:
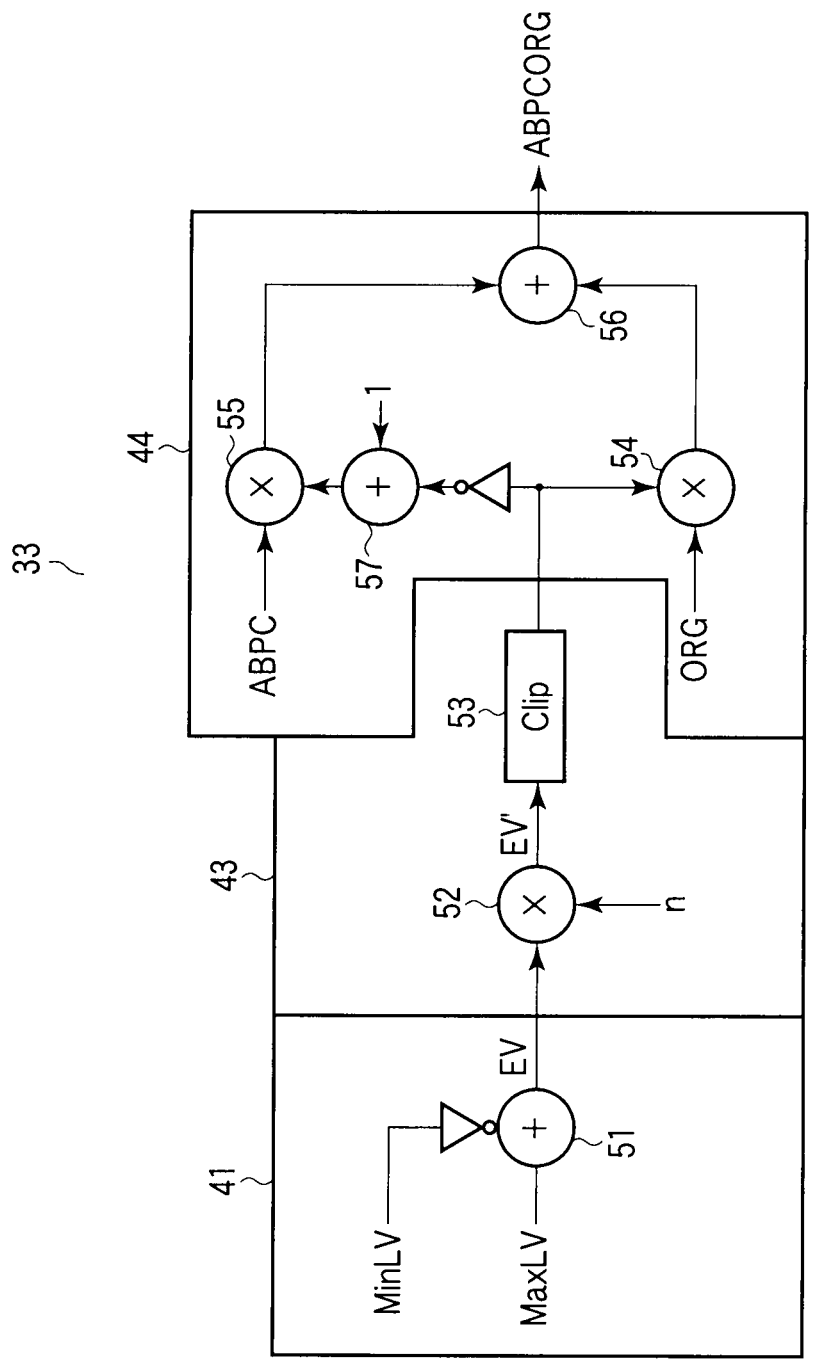
FIG. 8 is a block diagram showing the detailed configuration of the principal part of a signal processing circuit according to a second embodiment.

In general, according to one embodiment, an image defect correction processing circuit includes a signal level comparator circuit and a defect correction circuit. The signal level comparator circuit receives signals read from a plurality of pixels arrayed in an imaging area. Then, the circuit extracts the maximum signal level and the minimum signal level from a plurality of pixel signals existing around a correction target pixel. The defect correction circuit receives the foregoing maximum and minimum signal levels, and then, compares a signal from the correction target pixel with the foregoing maximum and minimum signal levels. In this way, the correction circuit determines whether or not the correction target pixel has a white defect or a black defect, and thus, according to the determination result, executes defect corrections with respect to the correction target pixel.

First Embodiment

Various embodiments will be hereinafter described with reference to the accompanying drawings. FIG. 1 shows the configuration of a solid-state imaging device according to a first embodiment. The solid-state imaging device shown in FIG. 1 is an amplification CMOS image sensor. In the CMOS image sensor, pixels, that is, unit cells $12\text{-}ij$ ($i=1, 2 \ldots, m, j=1, 2 \ldots, n$) are two-dimensionally arrayed like a matrix having m rows and n columns in an imaging area 11. In FIG. 1, one circuit configuration is typically shown having four rows and four columns as the imaging area 11.

The imaging area 11 is divided into a plurality of blocks in the vertical direction. Each unit cell column of the imaging area is connected to each of a plurality of vertical signal lines VLINi. One terminal of the imaging area 11, for example, the upper portion is provided with a plurality of load transistors TLMj for a source follower circuit, which is arranged in the horizontal direction. A current path of each load transistor TLMj is connected between one terminal of the vertical signal line VLINj and a ground node. Each gate electrode of load transistors TLMj is supplied with a bias voltage VTL output from a bias circuit 22.

The other terminal, that is, the vertical signal line VLINj, for example, the lower portion of the imaging area 11 is provided with a column noise cancellation circuit and analog-to-digital converter (CDS & ADC) 13, a latch circuit 14, a line memory 15 and a horizontal shift register circuit 16. Specifically, the latch circuit 14 latches a signal digitized by the ADC 13. The line memory 15 stores the latched signal. The horizontal shift register circuit 16 executes the control for reading a signal from the line memory 15. The foregoing latch circuit 14, line memory 15 and horizontal shift register circuit 16 form a horizontal drive circuit 17, which stores digital data obtained by the CDS & ADC 13 and successively outputs it as a video signal.

The imaging area 11 is provided with a vertical block selector circuit 18, an in-block line selector circuit 19 and a pulse selector circuit 20, which are arranged adjacent thereto. The pulse selector circuit 20 outputs a row select drive pulse signal ADREi, a reset drive pulse signal RESETi and a read drive pulse signal READi for each row of unit cell. The foregoing vertical block selector circuit 18, in-block line selector circuit 19 and pulse selector circuit 20 form a vertical drive circuit 21.

A block of the imaging area 11 is selected according to block select signals Vblock1 and Vblock2 output from the vertical block selector circuit 18. The vertical block selector circuit 18 includes a shift register circuit or decoder circuit. A unit cell row (pixel row) of the block selected by the vertical block selector circuit 18 is selected by the in-block line selector circuit 19 based on pixel row select signals BLine1 to BLine4. Further, a unit cell row is selected by the pulse selector circuit 20 based on an output signal of the in-block line selector circuit 19 and drive pulse signals RESETi, READi and ADRESi.

Each unit cell 12-$ij$ includes four transistors, that is, row select transistor Ta, amplification transistor Tb, reset transistor Tc, read transistor T and a photodiode PD. A unit cell 12-11 will be given as one example. In the unit cell 12-11, a current path of transistors Ta and Tb is connected in series between a supply node of a power supply voltage VDD and a vertical signal line VLIN1. A gate electrode of transistor Ta is supplied with a drive pulse signal ADRES1. A current path of transistor Tc is connected between a supply node of a power supply voltage VDD and a gate electrode (detector FD) of transistor Tb. The gate electrode of the transistor Tc is supplied with a drive pulse signal RESET1. One terminal of a current path of the transistor Td is connected to the detector FD, and a gate electrode thereof is supplied with a drive pulse signal READ1. The other terminal of the current path of transistor Td is connected with a cathode of a photodiode PD, and an anode of the photodiode PD is grounded.

The CDS & ADC 13 is provided with a plurality of capacitors C1$j$ and C2$j$ used for noise cancellation. Further, the CDS & ADC 13 is provided with a plurality of transistors TS1$j$ for transmitting a signal of a vertical signal line VLINj and two comparator circuits COMP1$j$ and COMP2$j$.

One terminal of a current path of the transistor TS1$j$ is connected to the vertical signal line VLINj, and a gate electrode thereof is supplied with a pulse signal S1 output from a timing generator (not shown). The other terminal of the current path of the transistor TS1$j$ is connected with one electrode of capacitors C1$j$ and C2$j$. The other electrode of capacitor C1$j$ is supplied with a comparison reference signal VREF (e.g., triangular wave signal) for an analog-to-digital converter (ADC) output from an amplifier circuit AMP. The other electrode of capacitor C2$j$ is connected to each input terminal of a plurality of comparator circuits COMP1$j$.

Each comparator circuit COMP1$j$ includes a plurality of inverters INV1$j$ and transistors TS2$j$ whose current path is connected between input and output terminals of these inverters INV1$j$. Likewise, each comparator circuit COMP2$j$ includes a plurality of inverters INV2$j$ and transistors TS3$j$ whose current path is connected between input and output terminals of these inverters INV2$j$. A plurality of capacitors C3$j$ are interposed between comparator circuits COMP1$j$ and COMP2$j$. Each gate electrode of transistors TS2$j$ is supplied with a pulse signal S2 while each gate electrode of transistors TS3$j$ is supplied with a pulse signal S3.

Digital signals having a plurality of bits are successively output from comparator circuits COMP2$j$, and then, these digital signals are latched by the latch circuit. In each unit cell, photo-electrically converting is performed. A video signal is converted to a digital signal in the CDS & ADC 13. The digitized video signal is successively output from the line memory. Then, the video signal is supplied to a signal processing circuit 23 so that defect corrections are performed.

FIG. 2 shows the configuration of the signal processing circuit 23 shown in FIG. 1. The signal processing circuit 23 includes a pre-gamma (γ) correction circuit 31, a four-horizontal-line memory 32, a defect correction block 33, a noise reduction circuit 34 and a reverse-gamma (γ) correction circuit 35. The defect correction block 33 includes a signal level comparator circuit 41, a defect correction circuit 42, an edge control circuit 43 and a weighting addition circuit 44. The signal level comparator circuit 41 executes extraction of pixel, signal level comparison and subtraction. The defect correction circuit 42 executes defect determination and defect corrections.

A video signal output from the line memory 15 of FIG. 1 is supplied to the pre-gamma (γ) correction circuit 31, and then, gamma (γ) correction is carried out before defect correction. The gamma (γ)-corrected video signal is supplied to the four-horizontal-line memory 32 so that the four-horizontal-line memory 32 extracts pixel signals equivalent to five lines. The extracted five-line pixel signals are supplied to the defect correction block 33.

In the defect correction block 33, the signal level comparator circuit 41 extracts a correction target pixel and peripheral five-by-five pixels around the correction target pixel from five-line pixel signals. Further, the maximum signal level MaxLV and the minimum signal level MinLV are extracted from the same-color peripheral eight pixel signals as the correction target pixel of the foregoing five-by-five pixels. Furthermore, in order to determine whether or not a signal of the correction target pixel is an edge portion such as an edge of pattern and line, the difference (edge signal) EV between the maximum and minimum signal levels is generated.

The defect correction circuit 42 compares a correction target pixel signal with maximum and minimum signal levels MaxLV and MinLV extracted by the signal level comparator circuit 41. In this way, it is determined whether or not the correction target pixel signal has a white or black defect. In accordance with the foregoing determined result, corrections for white and black defects are carried out. The edge control circuit 43 multiplies an edge signal EV by an optional multiplication coefficient. The multiplication coefficient is multiplied, and thereby, this serves to control a degree of edge detection (what level difference is determined as an edge) with respect to an edge signal EV generated by the signal level comparator circuit 41. The weighting addition circuit 44 adds a defect correction signal ABPC output from the defect correction circuit 42 and an original signal ORG of the correction target pixel based on a controlled edge signal EV' output from the edge control circuit 43. In this case, addition is carried out in a state of changing weighting. If the signal level difference between a defect correction target pixel and peripheral five-by-five pixel signals is large, addition is carried out in a state of making strong weighting of the original signal before defect correction. Conversely, if the foregoing difference is small, addition is carried out in a state of making strong weighting of an output of the defect correction circuit 42.

In the noise reduction circuit 34, two-dimensional median filtering is carried out with respect to a signal of a defect-corrected pixel output from the weighting addition circuit 44 and signals of peripheral five-by-five pixels around the foregoing pixel. In this way, random noise corrections are carried out. An output signal of the noise reduction circuit 34 is reverse-gamma (γ)-corrected by the reverse-gamma (γ) correction circuit 35, and thereafter, output to the after-stage circuit block.

When defect corrections are carried out with respect to an input signal, if a black defect exists in a black portion, the black defect is crushed; for this reason, it is difficult to find the black defect. Considering the foregoing circumstances, the pre-gamma (γ) correction circuit 31 executes gamma (γ) corrections so that black portions are decompressed while white portions are compressed. In this way, the foregoing black defect is easily found; therefore, corrections are suitably carried out. After defect corrections, the output signal is reverse-gamma (γ)-corrected by the reverse-gamma (γ) correction circuit 35, and then, restored to the original signal.

FIG. 3 shows the detailed circuit configuration of principal parts of the defect correction circuit block 33 of FIG. 2. In a signal level comparator circuit 41, a subtractor 51 subtracts the minimum signal level MinLV from the maximum signal level MaxLV generated from a signal the same-color peripheral eight pixels as a correction target pixel to generate an edge signal EV. An edge control circuit 43 includes a multiplier 52 and a clipping circuit 53. Specifically, the multiplier 53 executes a multiplication of foregoing edge signal EV and a multiplication coefficient n. The clipping circuit 53 clips a predetermined number of bits out of an output EV' of the multiplier 52. In this case, if the multiplication coefficient n is set larger, the smaller level difference is determined as an edge. Conversely, if the multiplication coefficient n is set smaller, the level difference is not determined as an edge when there is no big change of luminance.

A weighting addition circuit 44 includes two multipliers 54, 55 and an adder 56. Specifically, the multiplier 54 executes a multiplication of a controlled edge signal EV' and the original signal ORG of a correction target pixel. The multiplier 55 executes a multiplication of a complement value (255−EV') of the edge signal EV' to the maximum value 255 of an eight-bit digital signal and a defect correction signal ABPC. The adder 56 adds output signals from multipliers 54 and 55 to output a signal ABPCORG. In other words, the weighting addition circuit 44 generates an addition output signal ABPCORG obtained by the following equation (1) from the following signals. One of the signals is an edge signal EV' generated by the signal level comparator circuit 41 and controlled by the edge control circuit 43. Another is the original signal ORG of a correction target pixel. Another is a signal ABPC of a pixel defect-corrected by the defect correction circuit 42.

$$ABPCORG=\{ORG \times EV'+ABPC(255-EV')\}/256 \quad (1)$$

(where, $255=\alpha 1$, $256=\alpha 2$, $\alpha 1 < \alpha 2$)

The edge control circuit 43 is provided with the foregoing clipping circuit 53 in order to satisfy the following condition. Specifically, the clipping circuit 53 makes the coincidence of a number of bits of the controlled edge signal EV' and a number of bits of the multiplication coefficient input to multipliers 54 and 55 of the weighting addition circuit 44. For example, if the coefficient input to multipliers 54 and 55 is eight bits, the clipping circuit 53 clips the number of bits by eight bits when the bit number of the edge signal EV' is more than eight, and thus, outputs the edge signal to the weighting addition circuit 44. Therefore, when the bit number of the edge signal EV' is eight; the clipping circuit 53 may be omitted.

The operation of the signal processing circuit 23 will be explained below. In the defect correction circuit block 33, the signal level comparator circuit 41 extracts an arrangement pattern shown in FIG. 4, that is, a correction target center pixel (e.g., R22) and peripheral five-by-five pixels around the center pixel from five-line pixel signals. In FIG. 4, a symbol "R" denotes a red pixel, "G" denotes a green pixel and "B" denotes a blue pixel. In particular, a green pixel Gb denotes a green pixel between blue pixels B, and a green pixel Gr denotes a green pixel between red pixel R.

Further, the signal level comparator circuit 41 extracts maximum and minimum signal levels (MaxLV) and (MinLV) from peripheral eight-pixel signals of the same-color three-by-three pixels. The same-color three-by-three pixels includes a correction target center pixel (e.g., R22) and the same-color peripheral eight pixels (e.g., R44, R42, R40, R24, R20, R40, R02, R00) shown in FIG. 5. Specifically, the circuit 41 compares signal levels of other peripheral eight pixels of the correction target pixel (R22) in the extracted same-color three-by-three pixels to extract maximum and minimum signal levels. FIG. 6 shows the magnitude relationship of a signal level of peripheral eight pixels of the correction target pixel. In this case, of peripheral eight pixels, the first pixel signal level is the minimum signal level, and the eighth pixel signal level is the maximum signal level.

Furthermore, the signal level comparator circuit 41 generates an edge signal EV from the difference between the foregoing maximum and minimum signal levels. If the generated edge signal EV is larger than a predetermined threshold value, it is determined as an edge portion such as edges of pattern and line. Thus, the defect correction circuit does not execute defect corrections. As described above, an edge is detected; therefore, this serves to prevent erroneous corrections for an edge portion.

The defect correction circuit 42 determines a black defect and a white defect based on the comparison between the maximum or minimum signal level extracted by the signal level comparator circuit 41 and a signal level of the correction target pixel, and thus, executes defect corrections. Then, the circuit 42 determines whether or not a correction target pixel, that is, the center pixel has a defect based on the same-color nine pixel signals. As a result, if it is determined that the center pixel is a defect pixel, the circuit 42 executes the following defect corrections. Specifically, if the defect pixel has a white defect, a signal level of the defect pixel is replaced with the maximum signal level pixel of peripheral normal pixels. On the other hand, if the defect pixel has a black defect, a signal level of the defect pixel is replaced with the minimum signal level pixel of the same as above. According to this embodiment, the circuit 42 is realized on the assumption that other same-color peripheral pixels of the correction target center pixel are given as a normal pixel.

A method determining a defect will be explained below with reference to FIG. 7. White defect determination is made in the following manner.

(a) The defect correction circuit 42 calculates the difference between a signal level of the correction target center pixel R22 (shown in FIG. 5) and the maximum signal level (eighth level) of normal pixels, that is, same-color eight pixels. As seen from FIG. 7, if the signal level of the center pixel (R22) is larger than that of normal pixels, the circuit 42 determines that the center pixel has a white defect.

(b) If the difference between maximum and minimum signal levels is smaller than a predetermined threshold value, namely, only when a slight change of luminance exists in same-color eight pixels, corrections are carried out.

If the foregoing two conditions (a) and (b) are both satisfied, white defect corrections are carried out. When white defect corrections are carried out, the signal level of the center pixel R22 is replaced with the maximum signal level (eighth level) of normal pixels, that is, same-color eight pixels. In this case, even if the foregoing condition (b) only is satisfied, the replacement of the center pixel (R22) is not carried out. This is based on the following reason. Specifically, if the difference between maximum and minimum signal levels is large, the signal level difference is large around the correction target center pixel (R22); namely, there is a possibility that the center pixel is an edge.

Black defect determination is made in the following manner.

(c) The defect correction circuit 42 calculates the difference between a signal level of the correction target center pixel R22 (shown in FIG. 5) and the minimum signal level (first level) of normal pixels, that is, same-color eight pixels. As seen from FIG. 7, if the signal level of the center pixel (R22) is smaller than that of normal pixels, the circuit 42 determines that the center pixel has a black defect.

(d) If the difference between maximum and minimum signal levels is smaller than a predetermined threshold value, namely, only when a slight change of luminance exists in same-color eight pixels, corrections are carried out.

If the foregoing two conditions (c) and (d) are both satisfied, black defect corrections are carried out. When black defect corrections are carried out, the signal level of the center pixel R22 is replaced with the minimum signal level (first level) of normal pixels, that is, same-color eight pixels. In this case, even if the foregoing condition (d) only is satisfied, the replacement of the center pixel (R22) is not carried out. This is based on the following reason. Specifically, if the difference between maximum and minimum signal levels is large, the signal level difference is large around the correction target center pixel (R22); namely, there is a possibility that the center pixel is an edge. The defect correction circuit 42 executes the foregoing corrections; therefore, corrections for white defect and black defect are carried out.

According to this embodiment, corrections for black defect of one pixel and white defect of one pixel in nine pixels are possible on the assumption that eight pixels other than the correction target pixel are a normal pixel having no defect.

The defect correction circuit 42 generates the signal level difference between the maximum signal level pixel (eighth pixel) and the minimum signal level pixel (first pixel) of normal pixels shown in FIG. 7 as an edge signal EV. For example, if the signal level difference between the maximum signal level pixel (eighth pixel) and the minimum signal level pixel (first pixel) is small, the following determination is made. Namely, it is determined that a video signal is a flat image having no signal level difference between normal pixels, that is, first to eighth pixels.

Conversely, if the signal level difference between the first to eight pixels is large, the following determination is made. Namely, the signal level difference exists between normal pixels, that is, first to eighth pixels; therefore, it is determined that an edge exists therein. As described above, edge detection is carried out, and thereby, this serves to prevent erroneous corrections, and to carry out defect corrections without reducing a resolution of the defect-corrected video signal.

The edge signal EV is calculated from the signal level difference between the same-color pixels compared by the signal level comparator circuit 41. Therefore, there is no need to provide a special circuit for detecting an edge; as a result, this serves to prevent an increase of the circuit scale of the signal processing circuit.

The edge control circuit 43 multiplies an edge signal EV generated by the signal level comparator circuit 41 by a multiplication coefficient n for determining a degree of detecting an edge. If the multiplication coefficient n is set larger, the smaller level difference is determined as an edge. Conversely, if the multiplication coefficient n is set smaller, an edge signal is not determined as an edge so long as a change of luminance is not large. For example, if a coefficient input to multipliers 54 and 55 of the after-stage weighting addition circuit 44 has eight bits, this operation result is converted to an eight-bit signal by the clipping circuit 53, and thus, output as a controlled edge signal.

The weighting addition circuit 44 executes weighting addition according to the foregoing equation (1) to generate an addition output signal ABPCORG based on the following signals. One is a controlled edge signal EV' given by the edge control circuit 43. Another is the original signal ORG of a correction target pixel. Another is a signal ABPC of the pixel defect-corrected pixel by the effect correction circuit 42.

In this case, if the controlled edge signal EV' is large (i.e., the signal level difference between normal pixels is large), that is, the correction target center pixel (R22) is a pixel, which is situated on an edge, the following weighting addition is executed. Namely, a correction weight is set so that the ratio of the original signal ORG of the correction target pixel is increased.

Conversely, if the controlled edge signal EV' is small (i.e., the signal level difference between normal pixels is small), that is, the correction target center pixel (R22) is a pixel, which is not situated on an edge, the following weighting addition is executed. Namely, a correction weight is set so that the ratio of the signal ABPC of the pixel defect-corrected by the defect correction circuit 42 is increased.

The output of the weighting addition circuit 44 is noise-corrected at random by the noise reduction circuit 34. Further, the output is reverse-gamma-corrected by the reverse-gamma ($\gamma$) circuit 35, and thereafter, output to the after-stage circuit block, and then, a digital processing such as a YUV generation processing is carried out.

According to this embodiment, in the solid-state imaging device and the signal processing circuit, peripheral eight pixels excepting the correction target center pixel are assumed as a normal pixel. Further, an edge signal EV is generated using signals of maximum and minimum signal level pixels of peripheral eight pixels. Therefore, when the difference between maximum and minimum signal levels is small, the value of the edge signal EV becomes small. In this way, it is determined that a pixel is a flat video image having no change of color. Conversely, when the foregoing difference is large, the value of the edge signal EV becomes large. In this way, it is determined that a pixel is an edge having a large change of color.

If a correction target pixel is an edge having a large change of color, the weighting addition circuit 44 executes the weighting addition. Namely, a correction weight is set so that a ratio of the original signal of the correction target pixel is increased. In this way, an edge portion such as a pattern and an edge portion of lines such as longitudinal, horizontal and slant lines are left; therefore, this serves to prevent an error correction. In addition, it is possible to prevent reduction of resolution of a video signal.

Moreover, there is no need to newly provide a circuit for detecting an edge from a video signal. In addition, the signal level comparator circuit 41 extracts maximum and minimum signal levels only. This serves to dispense a rearrangement circuit for rearranging a plurality of pixel signals in the order of level, which has been conventionally required. Therefore, the signal level comparator circuit 41 has the circuit scale smaller than the conventional rearrangement circuit. As a result, the whole circuit scale is reduced compared with the conventional case.

Second Embodiment

FIG. 8 shows the detailed circuit configuration of principal parts of a defect correction circuit block 33. According the second embodiment, the defect correction circuit block 33 differs from the block according to the first embodiment shown in FIG. 3 in the following points. Specifically, a clipping circuit 53 clips an edge signal to 1 (EV'=1) when a value before clipping is 0 (EV'=0). Further, a weighting addition circuit 44 is additionally provided with an adder 57, which adds "1" to an inverted signal (complement signal) of a clipped edge signal EV'. Therefore, an acquirable value range of the clipped edge signal EV' is $1 \leq EV' \leq 255$. A multiplier 55 executes a multiplication of a defect correction signal ABPC and an output of the adder 57.

According to the first embodiment, the weighting addition circuit 44 generates an addition output signal ABPCORG according to the foregoing equation (1). According to the second embodiment, a weighting addition circuit 44 generates an addition output signal ABPCORG according to the following equation (2).

$$ABPCORG=\{ORG \times EV'+ABPC(256-EV')\}/256 \quad (2)$$

(where, $256=\alpha1=\alpha2$)

Thus, the output of the weighting addition circuit 44, that is, the addition output signal ABPCORG necessarily uses both outputs of the original signal of a correction target pixel and a defect correction signal. According to the second embodiment, the same effect as the first embodiment is obtained.

Third Embodiment

According to the first embodiment, when EV'=255, the output of the weighting addition circuit 44 is ABPCORG≈ORG. In other words, the output of the weighting addition circuit 44 becomes approximately the same as the original signal of a correction target pixel. Specifically, when EV'=255, the output of the weighting addition circuit 44 is regarded as the original signal of a correction target pixel. For this reason, an output of a defect correction circuit 42 is not used in a weighting addition circuit 44.

In such a case, the following control is carried out. Specifically, as seen from FIG. 9, an output of the edge control circuit 43 is supplied as a trigger signal to the defect correction circuit 42. When the value of a controlled edge signal EV' of the edge control circuit 43 is 255, the operation of the defect correction circuit 42 is stopped. Conversely, when the foregoing controlled edge signal EV' is values except 255, the defect correction circuit 42 is operated. In this way, the defect correction circuit 42 is operated only when it is required. According to the third embodiment, the same effect as the first embodiment is obtained. Moreover, the defect correction circuit 42 is operated only when it is required; therefore, this serves to obtain the effect of reducing energy consumption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
an imaging area including a plurality of pixels arrayed like a matrix and a plurality of pixel rows and columns;
a plurality of vertical signal lines connected in common to a plurality of pixels of each pixel column, and reading pixel signals from the pixels of each pixel column;
a vertical drive circuit configured to select a pixel row of the imaging area, and configured to supply a plurality of drive signals to each pixel of the selected pixel row so that a pixel signal is read from each pixel;
an analog-to-digital converter circuit connected to the vertical signal lines, and configured to convert and output each of pixel signals read to the vertical signal lines into a digital signal;
a horizontal drive circuit configured to receive and hold a signal digitized by the analog-to-digital converter circuit, and configured to successively output the held signal; and
a signal processing circuit configured to receive a signal output from the horizontal drive circuit, and configured to extract the maximum signal level and the minimum signal level from signals of a plurality of pixels existing around a correction target pixel, and further, configured to execute defect corrections of the correction target pixel based on the maximum signal level and the minimum signal level and a signal of the correction target pixel,
wherein the signal processing circuit includes:
a signal level comparator circuit configured to extract the maximum signal level and the minimum signal level from signals of a plurality of pixels existing around the correction target pixel; and
a defect correction circuit configured to receive the maximum signal level and the minimum signal level to compare each of the maximum signal level and the minimum signal level with a signal of the correction target pixel, and configured to determine whether or not the correction target pixel has a white defect or black defect, and further, configured to execute defect corrections on the correction target pixel according to the determined result,
wherein the defect correction circuit is configured to replace a signal of the correction target pixel with a signal of a pixel having the maximum signal level or the minimum signal level to execute defect corrections.

2. The device according to claim 1, wherein the signal level comparator circuit is configured to extract the maximum signal level and the minimum signal level from signals of a plurality of pixels, which exist around the correction target pixel in the imaging area and have the same color as the correction target pixel.

3. The device according to claim 1, wherein the signal level comparator circuit is configured to generate the difference between the maximum signal level and the minimum signal level as an edge signal.

4. The device according to claim 3, wherein the signal processing circuit further includes:
an edge control circuit configured to multiply the edge signal by an optional coefficient, and configured to output the multiplication result.

5. The device according to claim 4, wherein the edge control circuit includes:
a clipping circuit configured to clip the edge signal so that the edge signal is set to a predetermined number of bits.

6. A solid-state imaging device comprising:
an imaging area including a plurality of pixels arrayed like a matrix and a plurality of pixel rows and columns;
a plurality of vertical signal lines connected in common to a plurality of pixels of each pixel column, and reading pixel signals from the pixels of each pixel column;

a vertical drive circuit configured to select a pixel row of the imaging area, and configured to supply a plurality of drive signals to each pixel of the selected pixel row so that a pixel signal is read from each pixel;

an analog-to-digital converter circuit connected to the vertical signal lines, and configured to convert and output each of pixel signals read to the vertical signal lines into a digital signal;

a horizontal drive circuit configured to receive and hold a signal digitized by the analog-to-digital converter circuit, and configured to successively output the held signal; and a signal processing circuit configured to receive a signal output from the horizontal drive circuit, and configured to extract the maximum signal level and the minimum signal level from signals of a plurality of pixels existing around a correction target pixel, and further, configured to execute defect corrections of the correction target pixel based on the maximum signal level and the minimum signal level and a signal of the correction target pixel, wherein the signal processing circuit includes:

a signal level comparator circuit configured to extract the maximum signal level and the minimum signal level from signals of a plurality of pixels existing around the correction target pixel, and further configured to generate the difference between the maximum signal level and the minimum signal level as an edge signal, and a defect correction circuit configured to receive the maximum signal level and the minimum signal level to compare each of the maximum signal level and the minimum signal level with a signal of the correction target pixel, and configured to determine whether or not the correction target pixel has a white defect or black defect, and further, configured to execute defect corrections on the correction target pixel according to the determined result, wherein the defect correction circuit is further configured to receive the edge signal, and is configured to stop the defect corrections when the edge signal is larger than a predetermined threshold.

7. The device according to claim 6, wherein the signal level comparator circuit is configured to extract the maximum signal level and the minimum signal level from signals of a plurality of pixels, which exist around the correction target pixel in the imaging area and have the same color as the correction target pixel.

8. The device according to claim 6, wherein the defect correction circuit is configured to replace a signal of the correction target pixel with a signal of a pixel having the maximum signal level or the minimum signal level to execute defect corrections.

9. The device according to claim 6, wherein the signal processing circuit further includes:

an edge control circuit configured to multiply the edge signal by an optional coefficient, and configured to output the multiplication result.

10. The device according to claim 9, wherein the edge control circuit includes:

a clipping circuit configured to clip the edge signal so that the edge signal is set to a predetermined number of bits.

11. A solid-state imaging device comprising:

an imaging area including a plurality of pixels arrayed like a matrix and a plurality of pixel rows and columns;

a plurality of vertical signal lines connected in common to a plurality of pixels of each pixel column, and reading pixel signals from the pixels of each pixel column;

a vertical drive circuit configured to select a pixel row of the imaging area, and configured to supply a plurality of drive signals to each pixel of the selected pixel row so that a pixel signal is read from each pixel;

an analog-to-digital converter circuit connected to the vertical signal lines, and configured to convert and output each of pixel signals read to the vertical signal lines into a digital signal;

a horizontal drive circuit configured to receive and hold a signal digitized by the analog-to-digital converter circuit, and configured to successively output the held signal; and a signal processing circuit configured to receive a signal output from the horizontal drive circuit, and configured to extract the maximum signal level and the minimum signal level from signals of a plurality of pixels existing around a correction target pixel, and further, configured to execute defect corrections of the correction target pixel based on the maximum signal level and the minimum signal level and a signal of the correction target pixel, wherein the signal processing circuit includes:

a signal level comparator circuit configured to extract the maximum signal level and the minimum signal level from signals of a plurality of pixels existing around the correction target pixel, and further configured to generate the difference between the maximum signal level and the minimum signal level as an edge signal, and a defect correction circuit configured to receive the maximum signal level and the minimum signal level to compare each of the maximum signal level and the minimum signal level with a signal of the correction target pixel, and configured to determine whether or not the correction target pixel has a white defect or black defect, and further, configured to execute defect corrections on the correction target pixel according to the determined result, and a weighting addition circuit configured to execute an addition of the original signal of the correction target pixel and a pixel signal defect-corrected by the defect correction circuit according to weighting given in accordance with the edge signal.

12. The device according to claim 11, wherein the edge signal is set as EV, the original signal of the correction target pixel is set as ORG, the pixel signal defect-corrected by the defect correction circuit is set as ABPC and an addition output is set as ABPCORG, the weighting addition circuit configured to execute a weighting addition according to the following equation:

$$ABPCORG=\{ORG \times EV + ABPC(\alpha 1 - EV)\}/\alpha 1$$

where, $\alpha 1$ is a positive integer number.

13. The device according to claim 11, wherein the edge signal is set as EV, the original signal of the correction target pixel is set as ORG, the pixel signal defect-corrected by the defect correction circuit is set as ABPC and an addition output is set as ABPCORG, the weighting addition circuit configured to execute a weighting addition according to the following equation:

$$ABPCORG=\{ORG \times EV + ABPC(\alpha 1 - EV)\}/\alpha 2$$

where, $\alpha 1$ and $\alpha 2$ are each is a positive integer number, and $\alpha 1 \leq \alpha 2$.

14. The device according to claim 11, wherein the signal level comparator circuit is configured to extract the maximum signal level and the minimum signal level from signals of a plurality of pixels, which exist around the correction target pixel in the imaging area and have the same color as the correction target pixel.

15. The device according to claim 11, wherein the defect correction circuit is configured to replace a signal of the correction target pixel with a signal of a pixel having the maximum signal level or the minimum signal level to execute defect corrections.

16. The device according to claim 11, wherein the signal processing circuit further includes:
    an edge control circuit configured to multiply the edge signal by an optional coefficient, and configured to output the multiplication result.

17. The device according to claim 16, wherein the edge control circuit includes:
    a clipping circuit configured to clip the edge signal so that the edge signal is set to a predetermined number of bits.

18. The device according to claim 11, wherein the defect correction circuit is further configured to receive the edge signal, and configured to stop the defect corrections when the edge signal is larger than a predetermined threshold.

* * * * *